United States Patent
Meshkati et al.

(10) Patent No.: US 12,096,376 B2
(45) Date of Patent: Sep. 17, 2024

(54) TECHNIQUES FOR UPLINK TRANSMISSION-PERIOD-BASED TRANSMISSION POWER FOR RADIO FREQUENCY EXPOSURE COMPLIANCE

(71) Applicant: QUALCOMM Incorporated, San Diego, CA (US)

(72) Inventors: Farhad Meshkati, San Diego, CA (US); Raghu Narayan Challa, San Diego, CA (US); Tienyow Liu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 17/695,705

(22) Filed: Mar. 15, 2022

(65) Prior Publication Data

US 2022/0303912 A1    Sep. 22, 2022

Related U.S. Application Data

(60) Provisional application No. 63/163,034, filed on Mar. 18, 2021.

(51) Int. Cl.
*H04W 52/14* (2009.01)
*H04W 52/30* (2009.01)

(52) U.S. Cl.
CPC ......... *H04W 52/146* (2013.01); *H04W 52/30* (2013.01)

(58) Field of Classification Search
CPC ............ H04B 17/3913; H04W 52/146; H04W 52/223; H04W 52/30; H04W 52/367
See application file for complete search history.

(56) References Cited

U.S. PATENT DOCUMENTS 11,153,831 B1 * 10/2021 Shvodian ............ H04W 52/146
2013/0122827 A1    5/2013 Ali et al.
2017/0265148 A1 *  9/2017 Balasubramanian ........ H04W 52/248

(Continued)

FOREIGN PATENT DOCUMENTS

WO    WO-2020010232 A1    1/2020

OTHER PUBLICATIONS

International Search Report and Written Opinion—PCT/US2022/071180—ISA/EPO—Jun. 23, 2022.

*Primary Examiner* — Nguyen T Vo
(74) *Attorney, Agent, or Firm* — Dalei Dong; Holland & Hart LLP

(57) ABSTRACT

Methods, systems, and devices for wireless communications are described that support techniques for transmission power determination for radio frequency (RF) exposure compliance. A transmitting device, such as a user equipment (UE) may determine an uplink transmit power limit for a time window based on an RF limit and a duration of the time window. The device may use the power limit to determine an uplink transmit power based on a computed uplink transmission period for the time window that accounts for a time period during which the device is expected to actually transmit. The computed uplink transmission period may be based on one or more actual uplink transmission periods during one or more prior time windows, a predictive model, network signaling, or any combinations thereof. The device may transmit one or more uplink transmissions during the time window using the determined uplink transmit power.

30 Claims, 12 Drawing Sheets

(56) References Cited

U.S. PATENT DOCUMENTS

| | | | | |
|---|---|---|---|---|
| 2018/0020413 A1* | 1/2018 | Kim | .................... | H04W 52/225 |
| 2020/0021421 A1* | 1/2020 | Han | ......................... | H04L 5/14 |
| 2020/0374818 A1* | 11/2020 | Cai | .................... | H04W 52/146 |
| 2022/0104144 A1* | 3/2022 | Grabelkovsky | ..... | H04W 52/223 |

\* cited by examiner

TECHNIQUES FOR UPLINK TRANSMISSION-PERIOD-BASED TRANSMISSION POWER FOR RADIO FREQUENCY EXPOSURE COMPLIANCE

CROSS REFERENCE

The present application for patent claims the benefit of U.S. Provisional Patent Application No. 63/163,034 by MESHKATI et al., entitled "TECHNIQUES FOR UPLINK TRANSMISSION-PERIOD-BASED TRANSMISSION POWER FOR RADIO FREQUENCY EXPOSURE COMPLIANCE," filed Mar. 18, 2021, assigned to the assignee hereof, and expressly incorporated by reference herein.

FIELD OF TECHNOLOGY

The present disclosure relates to wireless communications, including techniques for uplink transmission-period-based transmission power for radio frequency exposure compliance.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communication devices (such as UEs) deployed in wireless communications systems are generally required to comply with radio frequency (RF) exposure limits set by domestic or international standards or regulations. In order to comply with such RF exposure limits, such wireless communication devices may undergo a certification process prior to being shipped to market. Further, such wireless communication devices may employ techniques to assess RF exposure from the wireless communication devices in real time and adjust transmission powers accordingly to comply with the RF exposure limits. Efficient techniques for transmission power adjustments are thus desirable to provide compliance with RF exposure limits based on conditions at a wireless communication device.

SUMMARY

The described techniques relate to improved methods, systems, devices, and apparatuses that support techniques for uplink transmission-period-based transmission power for radio frequency (RF) exposure compliance. In accordance with various aspects, the described techniques provide for determining an uplink transmit power for a transmitting device (e.g. a user equipment (UE)) that complies with RF exposure limits and is based on conditions at the device. In some cases, a device may determine an uplink transmit power limit for a time window based on an RF limit and a duration of the time window (e.g., according to an outer loop power control procedure). The device may use the determined uplink transmit power limit to determine an uplink transmit power based on a computed uplink transmission period for the time window that accounts for a time period during which the device is expected to actually transmit uplink communications. In some cases, the computed uplink transmission period may be based at least in part on one or more actual uplink transmission periods during one or more prior time windows, based on a predictive model, based on network signaling, or any combinations thereof. The device may transmit one or more uplink transmissions during the time window using the determined uplink transmit power.

A method for wireless communication at a user equipment (UE) is described. The method may include determining an uplink transmit power limit for a first time window based on a radio frequency exposure limit and a duration of the first time window, determining a first uplink transmit power based on the uplink transmit power limit and a computed uplink transmission period for the first time window, where the computed uplink transmission period is based on an actual uplink transmission period during at least a second time window that is prior to the first time window, and transmitting one or more uplink transmissions during the first time window at the first uplink transmit power.

An apparatus for wireless communication at a UE is described. The apparatus may include a processor, memory coupled with the processor, and instructions stored in the memory. The instructions may be executable by the processor to cause the apparatus to determine an uplink transmit power limit for a first time window based on a radio frequency exposure limit and a duration of the first time window, determine a first uplink transmit power based on the uplink transmit power limit and a computed uplink transmission period for the first time window, where the computed uplink transmission period is based on an actual uplink transmission period during at least a second time window that is prior to the first time window, and transmit one or more uplink transmissions during the first time window at the first uplink transmit power.

Another apparatus for wireless communication at a UE is described. The apparatus may include means for determining an uplink transmit power limit for a first time window based on a radio frequency exposure limit and a duration of the first time window, means for determining a first uplink transmit power based on the uplink transmit power limit and a computed uplink transmission period for the first time window, where the computed uplink transmission period is based on an actual uplink transmission period during at least a second time window that is prior to the first time window, and means for transmitting one or more uplink transmissions during the first time window at the first uplink transmit power.

A non-transitory computer-readable medium storing code for wireless communication at a UE is described. The code may include instructions executable by a processor to determine an uplink transmit power limit for a first time window based on a radio frequency exposure limit and a duration of the first time window, determine a first uplink transmit power based on the uplink transmit power limit and a computed uplink transmission period for the first time window, where the computed uplink transmission period is based on an actual uplink transmission period during at least a second time window that is prior to the first time window, and transmit one or more uplink transmissions during the first time window at the first uplink transmit power.

In some examples of the method, apparatuses, and non-transitory computer-readable medium described herein, the uplink transmit power limit for the first time window provides an average power for uplink transmissions that span an entire time period of the first time window and that meets the radio frequency exposure limit, and is determined based on a transmit power control procedure that spans a set of multiple time windows.

In some examples of the method, apparatuses, and non-transitory computer-readable medium described herein, the determining the first uplink transmit power may include operations, features, means, or instructions for scaling the uplink transmit power limit for the first time window based on the computed uplink transmission period, or a predicted uplink transmission period, to obtain a scaled uplink transmit power limit, and where the first uplink transmit power is based on the scaled uplink transmit power limit.

In some examples of the method, apparatuses, and non-transitory computer-readable medium described herein, the determining the first uplink transmit power may include operations, features, means, or instructions for scaling the maximum allowed transmit power for the first time window based on a configured maximum uplink transmission period to obtain a scaled maximum allowed transmit power and selecting a minimum of the scaled uplink transmit power limit or the scaled maximum allowed transmit power as the first uplink transmit power.

In some examples of the method, apparatuses, and non-transitory computer-readable medium described herein, the determining the first uplink transmit power may include operations, features, means, or instructions for obtaining, based on a transmit power control procedure that spans a set of multiple time windows prior to the first time window, an adjusted average power for uplink transmissions that span an entire time period of the first time window and a maximum allowed transmit power for the first time window that meets the radio frequency exposure limit, where the adjusted average power is adjusted based on an energy usage of uplink transmissions over the set of multiple time windows, scaling the adjusted average power based on the computed uplink transmission period to obtain a scaled adjusted average power, scaling the maximum allowed transmit power for the first time window based on a configured maximum uplink transmission period to obtain a scaled maximum allowed transmit power, and selecting a minimum of the scaled adjusted average power or the scaled maximum allowed transmit power as the first uplink transmit power.

In some examples of the method, apparatuses, and non-transitory computer-readable medium described herein, the uplink transmit power limit includes a first uplink transmit power limit for an entire time period of the first time window, and the determining the first uplink transmit power may include operations, features, means, or instructions for scaling the first uplink transmit power limit to obtain a second uplink transmit power limit, and scaling the second uplink transmit power limit to obtain a third uplink transmit power limit, where the first uplink transmit power is based on the third uplink transmit power limit. In some examples of the method, apparatuses, and non-transitory computer-readable medium described herein, the first uplink transmit power limit is scaled based on a configured maximum uplink transmission period in the first time window to obtain the second uplink transmit power limit, and the second uplink transmit power limit is scaled based on the computed uplink transmission period in the first time window to obtain the third uplink transmit power limit. In some examples of the method, apparatuses, and non-transitory computer-readable medium described herein, the first uplink transmit power limit is scaled based on the computed uplink transmission period in the first time window to obtain the second uplink transmit power limit, and the second uplink transmit power limit is scaled based on a configured maximum uplink transmission period in the first time window to obtain the third uplink transmit power limit. In some examples of the method, apparatuses, and non-transitory computer-readable medium described herein, the computed uplink transmission period is less than a configured maximum uplink transmission period that is configured at the UE through radio resource control (RRC) signaling.

In some examples of the method, apparatuses, and non-transitory computer-readable medium described herein, the computed uplink transmission period is based on an average actual uplink transmission period of a predetermined number of time windows prior to the first time window. In some examples of the method, apparatuses, and non-transitory computer-readable medium described herein, the predetermined number of time windows prior to the first time window correspond to a predetermined number of milliseconds over which to average actual uplink transmission periods. In some examples of the method, apparatuses, and non-transitory computer-readable medium described herein, the computed uplink transmission period may be based on one or more applications that generates uplink data that is to be transmitted during the first time window.

In some examples of the method, apparatuses, and non-transitory computer-readable medium described herein, the computed uplink transmission period may be based on one or more of a predictive model generated using artificial intelligence or machine learning, a type of application that generates uplink data that is to be transmitted, or any combinations thereof. In some examples of the method, apparatuses, and non-transitory computer-readable medium described herein, the predictive model may be based on predicted upcoming network conditions and associated uplink transmission periods. In some examples of the method, apparatuses, and non-transitory computer-readable medium described herein, the computed uplink transmission period may be based on an indication received from a network node that provides the computed uplink transmission period based on observed uplink transmission period of a set of multiple different UEs.

In some examples of the method, apparatuses, and non-transitory computer-readable medium described herein, the computed uplink transmission period may be based on one or more of a transmit power pattern of the UE, an antenna usage pattern of the UE, a user behavior pattern, an uplink transmission type, an uplink transmission priority pattern, an application pattern, an application type that generated uplink data to be transmitted, a wireless network pattern, sensor information at the UE, or any combinations thereof. In some examples of the method, apparatuses, and non-transitory computer-readable medium described herein, the radio frequency exposure limit includes a specific absorption rate (SAR) limit, maximum permissible exposure (MPE) limit, power density (PD) limit, or any combinations thereof. In some examples of the method, apparatuses, and non-transitory computer-readable medium described herein, the first uplink transmit power may be higher than the uplink transmit power limit of the first time window. In some examples of the method, apparatuses, and non-transitory computer-readable medium described herein, the uplink transmit power limit of the first time window may be determined based on the radio frequency exposure limit and one or more transmit powers of one or more other radios at the UE during at least the first time window.

DETAILED DESCRIPTION

Figure 1:
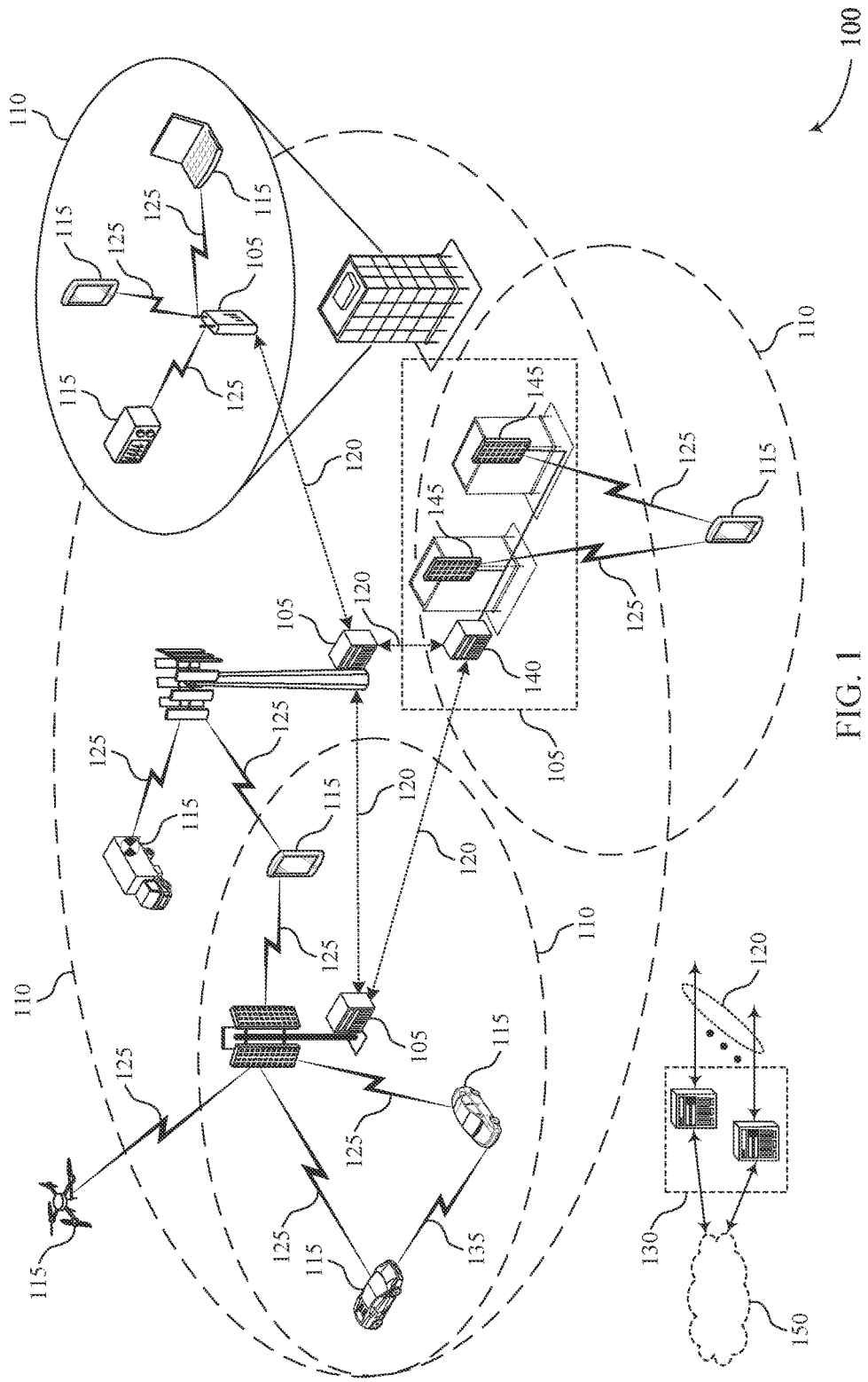
FIG. 1 illustrates an example of a wireless communications system that supports techniques for uplink transmission-period-based transmission power for radio frequency exposure compliance in accordance with aspects of the present disclosure.

Aspects of the present disclosure provide techniques for radio frequency (RF) exposure compliance based on conditions at a transmitting device (e.g., a user equipment (UE)). RF exposure limits may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm$^2$. In some cases, a maximum permissible exposure (MPE) limit in terms of PD may be present for wireless communication devices using transmission frequencies above 6 GHz (e.g., for millimeter wave (mmW) transmissions). The MPE limit is a regulatory metric for exposure based on area, such as an energy density limit defined as a number (X) watts per square meter (W/m$^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, Bluetooth, etc. PD may be used to assess RF exposure for transmission frequencies higher than 6 GHz, which cover wireless communication technologies such as IEEE 802.11ad, 802.11ay, 5G in mmW bands, etc. Thus, different metrics may be used to assess RF exposure for different wireless communication technologies.

In some cases, a UE may perform power control procedures for compliance with RF exposure limitations such as SAR and MPE. In some cases, the UE may perform time averaging of transmit powers across a moving time window to provide overall RF emissions that are within RF exposure limits for the time window. In some examples, a UE may run what may be referred to as an outer loop power control procedure in which RF emissions over an averaging window (e.g., a 100 second sliding window) may be time averaged, and a power limit for a current time window (e.g., a 500 ms window) may be provided. An inner loop power control procedure may then determine power levels for uplink transmissions within the current time window.

In some cases, the power control procedure may provide an indication of a maximum power (Pnm) for the current time window (e.g., a 500 ms time window), which indicates the average maximum power available for transmissions during the current time window. In some cases, the provided $P_{max}$ may be scaled based on a configuration that is provided to the UE (e.g., a radio resource control (RRC) configuration), that indicates a portion of the time window during which downlink communications may be transmitted and a portion of the time window during which uplink communications may be transmitted (e.g., based on a configured time division duplexing (TDD) format). Based on such a configuration, the UE may scale the value of $P_{max}$ to account for the portion of the time window that is configured for uplink communications. However, the UE may be allocated with uplink resources that occupy only a portion of the time window that is configured for uplink communications. For example, if the outer loop provided $P_{max}$=17 dBm and the configuration of the time window provides that 50% of the window is configured for uplink, the value of $P_{max}$ may be scaled to 20 dBm, but if the actual uplink transmissions from the UE only use 25% of the window, the UE could use a transmit power ($P_{tx}$) of 23 dBm and still comply with the outer loop provided value of $P_{max}$.

Various aspects of the present disclosure provide techniques for determining a transmit power for uplink communications in a time window based on the provided $P_{max}$ power and a computed amount of time during which the UE is expected to transmit uplink communications, which may be referred to herein as an uplink transmission period. In some cases, a UE may determine an uplink transmit power limit for a time window (e.g., a $P_{max}$ for the time window according to an outer loop power control procedure). The UE may use the determined uplink transmit power limit to determine an uplink transmit power based on the computed uplink transmission period within the time window. In some cases, the computed uplink transmission period may be based at least in part on one or more actual uplink transmission periods during one or more prior time windows, based on a predictive model, based on network signaling, or any combinations thereof. Accordingly, the uplink transmission period in many or most cases is non-continuous within the time window and may occupy a smaller portion of the time window than the portion of the time window that is configured for uplink communications (e.g., according to a RRC TDD format). The UE may transmit one or more uplink transmissions during the time window using the determined uplink transmit power. It is noted that while various examples discussed herein are provided for 5G communications (e.g., wireless wide area network (WWAN) communications), the scope of the present disclosure and techniques discussed herein may apply to any wireless communications or RAT (e.g., 2G/3G, 4G, 5G (e.g., sub-6 GHz or mmW bands), IEEE 802.11 or Wi-Fi, Bluetooth, etc.).

In some cases, the UE may compute an average of actual uplink transmission periods over a predetermined time period (e.g., 1000 ms) and use this computed uplink transmission period and the value of $P_{max}$ (e.g., that is provided by the outer loop power control procedure) to come up with the uplink transmit power for the current time window. In other cases, the computed uplink transmission period may be determined based on a predictive model (e.g., a machine learning or artificial intelligence model). In some cases, the UE may determine a value for a power limit ($P_{lim}$) for the current time window, and scale this value based on the computed uplink transmission period. In some cases, the power control procedure may also provide a power cap (e.g., $P_{cap}$) that indicates a hard limit for transmission power. In some cases, a minimum of the scaled $P_{lim}$ value or $P_{cap}$ value may be selected as the transmit power (e.g., $P_{tx}$) for the current time period. In some cases, the value of $P_{lim}$ may be set to the value of $P_{max}$ that is provided by the outer loop. In other cases, the value of $P_{lim}$ may be scaled to provide a value $\hat{P}$ that is based on past energy usage. The value $\hat{P}$ may then be scaled based on the computed uplink transmission period, and a minimum of the scaled $\hat{P}$ value or $P_{cap}$ value may be selected as the transmit power (e.g., $P_{tx}$) for the current time period. In some cases, the value of $P_{cap}$ may be scaled based on the configured uplink portion of the current time period.

Such techniques may provide efficient mechanisms for a UE to comply with one or more RF exposure limitations. Further, such techniques may provide transmit powers that more closely match determined powers of power control procedures and may enhance communications by providing higher reliability and, as a result, fewer retransmissions. Thus, latency, bandwidth, and network efficiency may be enhanced, providing reduced power consumption (e.g., through fewer retransmissions, higher coding rates, etc.) and improved user experience.

Aspects of the disclosure are initially described in the context of wireless communications systems. Aspects of the disclosure are further illustrated by and described with reference to resource diagrams, flow charts, apparatus diagrams, system diagrams, and flowcharts that relate to techniques for uplink transmission-period-based transmission power for radio frequency exposure compliance.

FIG. 1 illustrates an example of a wireless communications system 100 that supports techniques for uplink transmission-period-based transmission power for radio frequency exposure compliance in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (TAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz), for example. In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more of the UEs 115 may support techniques for transmission power determination for RF exposure compliance. In some cases, a UE 115 may determine an uplink transmit power limit for a time window based on a RF limit and a duration of the time window (e.g., according to an outer loop power control procedure). The UE 115 may use the determined uplink transmit power limit to determine an uplink transmit power based on a computed uplink transmission period for the time window that accounts for a time period during which the UE 115 is expected to actually transmit uplink communications. The UE 115 may transmit one or more uplink transmissions during the time window using the determined uplink transmit power.

Figure 2:
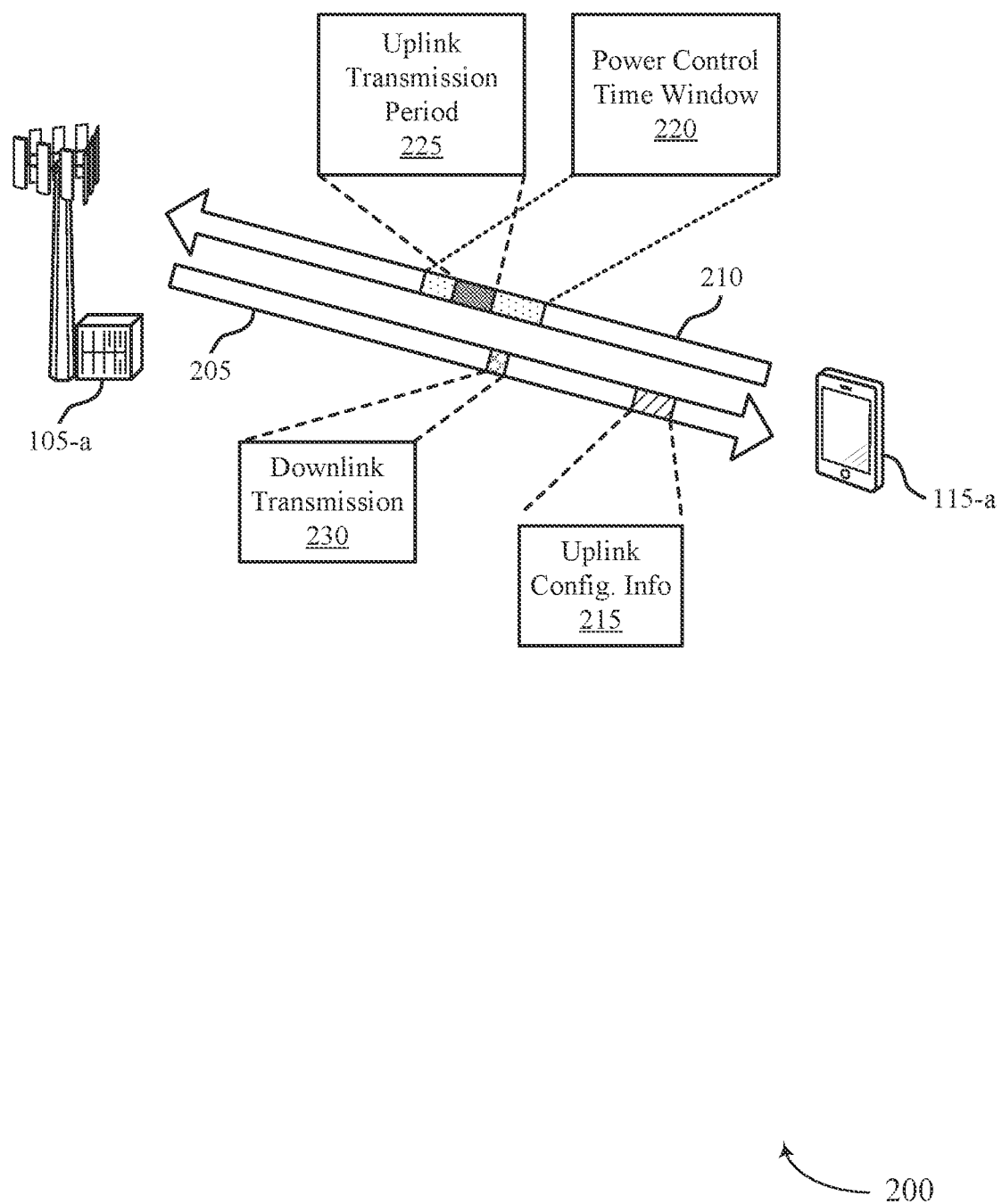
FIG. 2 illustrates an example of a wireless communications system that supports techniques for uplink transmission-period-based transmission power for radio frequency exposure compliance in accordance with aspects of the present disclosure.

FIG. 2 illustrates an example of a wireless communications system 200 that supports techniques for uplink transmission-period-based transmission power for radio frequency exposure compliance in accordance with aspects of the present disclosure. Wireless communications system 200 may include a UE 115-*a* and a base station 105-*a*, which may be examples of the corresponding devices described with reference to FIG. 1.

The UE 115-*a* may communicate with the base station 105-*a* using a downlink communication link 205 (or multiple links), and an uplink communication link 210 (or multiple links). In some cases, the base station 105-*a* may provide uplink configuration information 215 to the UE 115-*a*. The uplink configuration information 215 may include, for example, an uplink and downlink configuration (e.g., a TDD configuration) for communications that indicates resources for uplink and downlink communications. In some cases, the uplink configuration information 215 may be provided in RRC configuration information and may provide a TDD configuration that designates slots for uplink or downlink. In some cases, the UE 115-*a* may be allocated with resources for uplink communications and may determine an uplink transmit power in accordance with techniques as discussed herein.

In some cases, the UE 115-*a* may perform one or more power control procedures that provide indications of transmit powers that comply with RF exposure limits. For example, an outer loop power control procedure may provide a power limit for a current power control time window 220 (e.g., a 500 ms window), and an inner loop power control procedure may then determine power levels for uplink transmissions within the power control time window 220. In some cases, an uplink transmission period 225 within the power control time window 220 may be computed. For example, the UE 115-a may compute an uplink duty cycle (e.g., ULDC_computed) based on a prior time period, such as 1000 ms, and this uplink duty cycle may be set as the uplink transmission period 225. In some cases, the uplink transmission period 225 may account for the uplink configuration information 215 (e.g., the TDD configuration) as well as the historical proportion of the actual uplink transmissions of the UE 115-a within uplink resources. For instance, the uplink transmission period 225 may be an estimate of the uplink resources to be used by the UE 115-a for uplink transmissions in the power control time window 220, and the uplink transmission period 225 may be shorter than a configured (e.g., maximum) uplink transmission period in the power control time window 220. That is, the UE 115-a may actually use less resources for uplink transmissions than the resources allocated for uplink transmissions in the power control time window 220.

Figure 3:
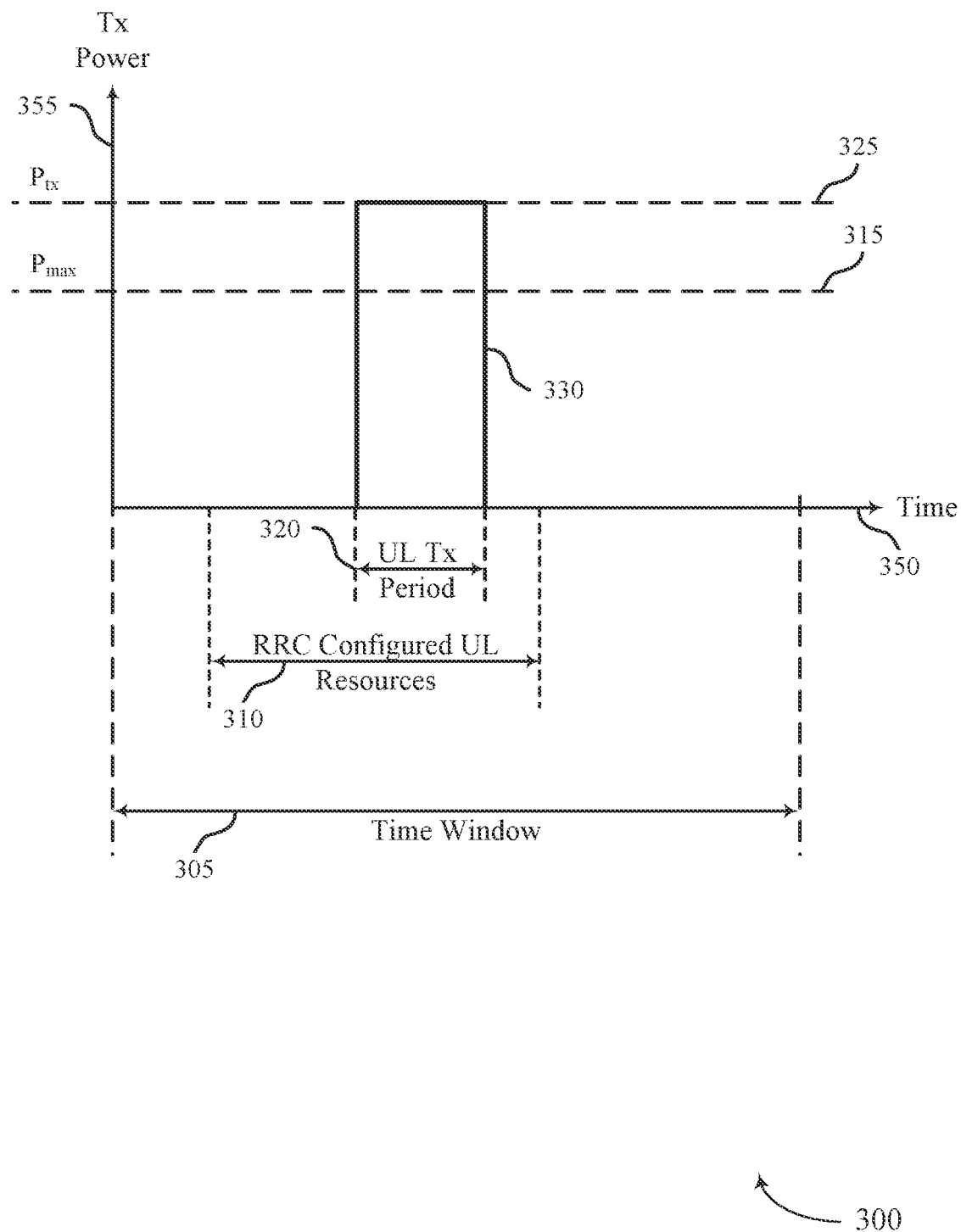
FIG. 3 illustrates an example of a transmission power for a time window according to techniques for uplink transmission-period-based transmission power for radio frequency exposure compliance in accordance with aspects of the present disclosure.
Figure 4:
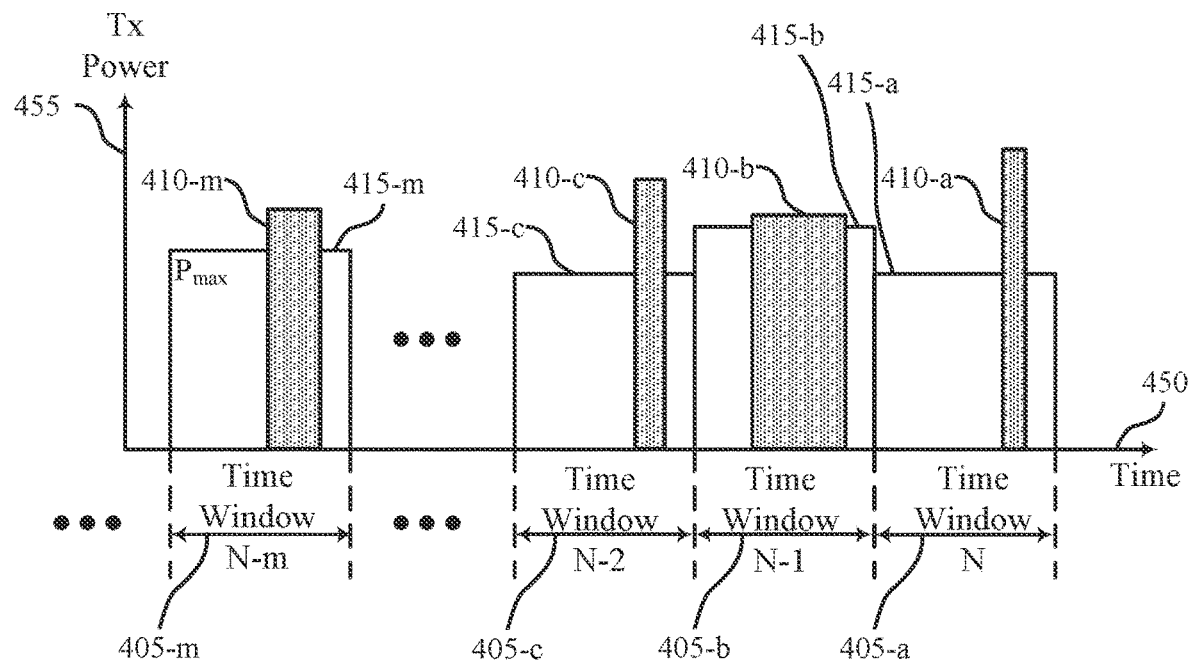
FIG. 4 illustrates an example of transmission powers in multiple time windows based on techniques for uplink transmission-period-based transmission power for radio frequency exposure compliance in accordance with aspects of the present disclosure.

For example, a TDD configuration may provide that 50% of the slots are configured for uplink communications, and the other 50% of the slots are configured for downlink transmissions (e.g., downlink transmissions 230). Further, the UE 115-a may determine that allocations to the UE 115-a are provided for 20% of the configured uplink slots. Accordingly, in such an example, the UE 115-a may compute the uplink transmission period 225 as 10% (i.e., 20% of 50%) of the power control time window 220. Accordingly, if the power control procedure provides a transmit power limit (Pnm) for the power control time window 220, the UE 115-a in some cases, may scale the value by 10 based on the computed uplink transmission period 225, and use the scaled value to set a transmission power. In some prior systems, the transmit power limit may be scaled according to the RRC configuration (i.e., 50%), and thus the UE 115-a in such cases may transmit at a lower power than necessary to comply with the RF exposure limits. Accordingly, techniques such as discussed herein may provide enhanced reliability of communications by setting transmit powers that more closely comply with RF exposure limits, particularly in cases where an actual uplink duty cycle is substantially different from an RRC-configured uplink duty cycle. FIGS. 3 and 4 show examples of time windows and uplink transmission powers in accordance with techniques as discussed herein.

FIG. 3 illustrates an example 300 of a transmission power for a time window according to techniques for uplink transmission-period-based transmission power for radio frequency exposure compliance in accordance with aspects of the present disclosure. The example 300 may be implemented by a UE (e.g., a UE 115) such as discussed with reference to FIGS. 1 and 2, or another wireless device that operates in accordance with one or more RF exposure limits (e.g., SAR/MPE limits).

In this example, a time window 305 may be configured for power control based on one or more power control procedures, as indicated on time axis 350. In some cases, a power control procedure (e.g., an outer loop power control procedure) may provide a value of $P_{max}$ 315 for the time window 305, as indicated on transmit power axis 355. Such a power value may be set by the power control procedure for compliance with RF exposure limitations such as SAR and MPE. In some cases, the power control procedure may perform time averaging of transmit powers across a moving time window (e.g., 100 seconds) to provide overall RF emissions that are within RF exposure limits for the time window 305, and $P_{max}$ 315 may be provided for the current time window 305 (e.g., a 500 ms window). In some cases, the power control procedure may account for different transmissions of different radios at a UE, such as a Wi-Fi radio, Bluetooth radio, 5G radio, etc.

In some cases, the value of $P_{max}$ 315 may indicate the average maximum power available for transmissions 330 during the time window 305. In some cases, the provided $P_{max}$ 315 may be scaled based on both an uplink resource configuration that indicates configured uplink resources 310 (e.g., an RRC configuration) and a computed uplink transmission period 320 that corresponds to the portion of the time window 305 during which uplink transmissions 330 may be actually transmitted. Based on such a configuration, the UE may scale the value of $P_{max}$ 315 to account for the portion of the time window 305 that actually contains uplink transmissions 330, to generate a transmit power $P_{tx}$ 325. For example, if an outer loop provided $P_{max}$=17 dBm, and the configured uplink resources 310 provides that 50% of the time window 305 is configured for uplink, the value of $P_{max}$ 315 may be scaled to 20 dBm, but if actual uplink transmissions from the UE only use 25% of the time window 305, the UE could use a transmit power ($P_{tx}$ 325) of 23 dBm and still comply with the outer loop provided value of $P_{max}$ 315 (e.g., for the time window 305).

FIG. 4 illustrates an example 400 of transmission powers in multiple time windows according to techniques for uplink transmission-period-based transmission power for radio frequency exposure compliance in accordance with aspects of the present disclosure. The example 400 may be implemented by a UE (e.g., a UE 115) such as discussed with reference to FIGS. 1-3, or another wireless device that operates in accordance with one or more RF exposure limits (e.g., SAR/MPE limits).

In this example, a series of time windows 405 may be configured for power control based on one or more power control procedures, as indicated on time axis 450. In addition, power control procedures may provide a value of $P_{max}$ for each time window 405 (e.g., a transmit power value provided by an outer loop power control procedure for each 500 ms time window 405), as indicated on transmit power axis 455. In this example, a current time window 405-a (time window N) may have a first $P_{max}$ value 415-a that may be based on a number of prior time windows 405-b through 405-m that each have corresponding $P_{max}$ values 415-b through 415-m. Each time window 405 may have an associated uplink transmission 410, with an associated transmit power ($P_{tx}$), that may be determined according to techniques as discussed herein.

In the example of FIG. 4, successive time windows 405 may have different values of $P_{max}$ 415, such that the $P_{max}$ 415-a value of the current time window 405-a is based on prior uplink transmissions 410-b through 410-m, as well as a computed uplink transmission period associated with the current time window 405-a. In some cases, a UE may compute an uplink transmission period based on an average of actual uplink transmission periods over the prior time windows 405-b through 405-m (e.g., corresponding to 1000 ms of prior time windows) and use this computed uplink transmission period with the value of $P_{max}$ 415-a to determine the uplink transmit power for the uplink transmission 410-a of the current time window 405-a. In other cases, the computed uplink transmission period may be determined based on a predictive model (e.g., a machine learning or artificial intelligence model). For example, the UE may use various predictive models to determine the computed uplink transmission period based on observed patterns or behaviors of the UE.

In some cases, a UE may use machine learning to predict/learn future transmission events based on a pattern. For example, the UE may use machine learning to predict/learn future network/radio conditions (e.g., a home-to-work route), user behavior based on past network conditions, and the like. In such cases, the UE may use machine learning or artificial intelligence to map upcoming UE behavior (e.g., data bursts or a big data package) to current network conditions (e.g., stationary), or current user behavior to upcoming network conditions (e.g., in mobility scenario), or current user behavior to both upcoming user behavior and upcoming network conditions. In some aspects, the UE may use machine learning to predict other characteristics associated with upcoming transmissions (such as antenna switching, sensor information, application type and/or behavior, etc.) from a pattern. In some aspects, the characteristics predicted with the pattern may be generated with various models or estimates, such as machine learning, artificial intelligence, neural networks, regression analysis, etc. The UE may thus determine the transmit power ($P_{tx}$) for the uplink transmission 410-a with machine learning based at least in part on the pattern. Additionally, or alternatively, the UE may receive an indication from a network that provides a predictive model or information to be used to determine the computed uplink transmission period (e.g., based on crowd-sourced information from multiple devices).

Figure 5:
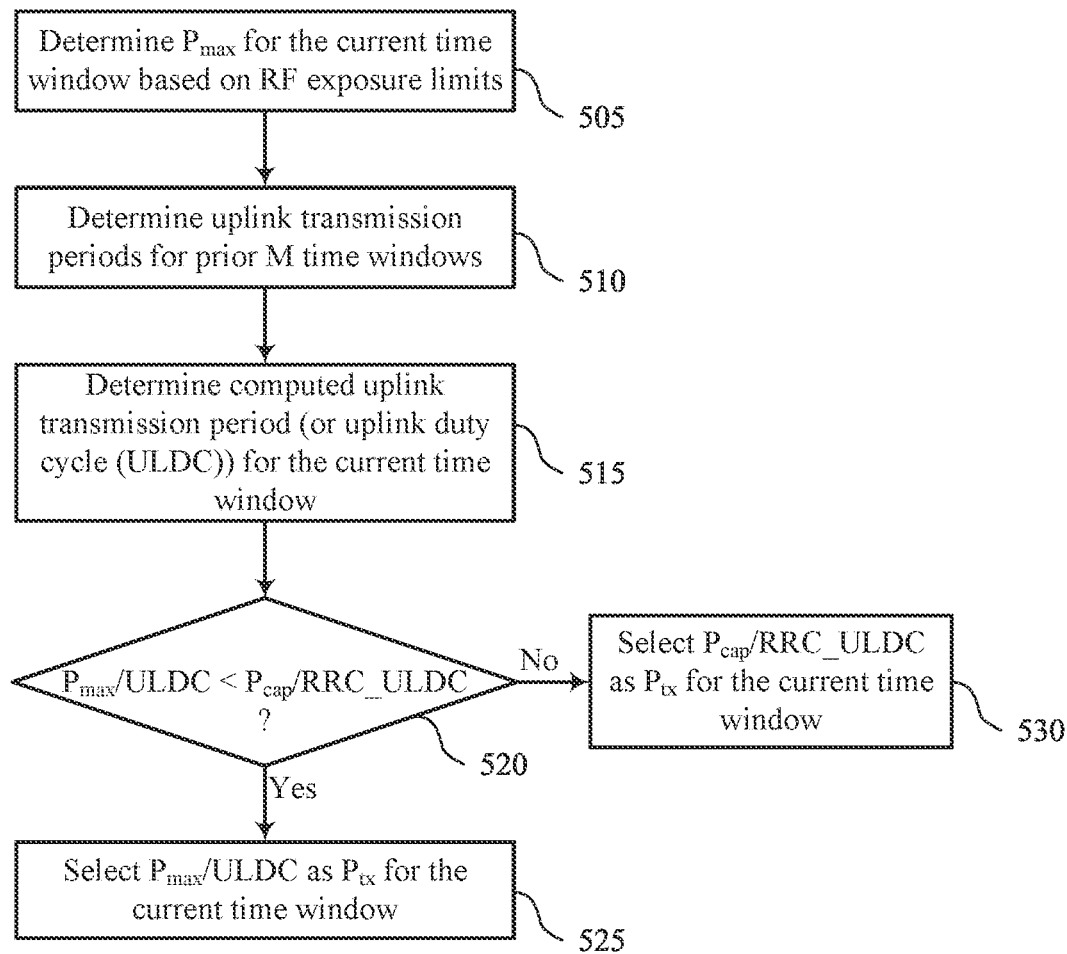
FIG. 5 illustrates an example of a flow chart that supports techniques for uplink transmission-period-based transmission power for radio frequency exposure compliance in accordance with aspects of the present disclosure.

FIG. 5 illustrates an example of a flow chart 500 that supports techniques for uplink transmission-period-based transmission power for radio frequency exposure compliance in accordance with aspects of the present disclosure. In some examples, the operations of flow chart 500 may be implemented by a UE, such as described with reference to FIGS. 1-4. While the example of FIG. 5 is discussed in relation to a UE, the operations and techniques may be implemented by other devices, such as a base station or other wireless node, and operations at other types of devices are within the scope of the present disclosure. In the following description of the flow chart 500, the described operations may be performed in a different order than the example order shown. Some operations may also be omitted from the flow chart 500, and other operations may be added to the flow chart 500.

In some examples, the operations illustrated in flow chart 500 may be performed by hardware (e.g., including circuitry, processing blocks, logic components, and other components), code (e.g., software or firmware) executed by a processor, or any combination thereof. Alternative examples of the following may be implemented, where some operations are performed in a different order than described or are not performed at all. In some cases, operations may include additional features not mentioned below, or further operations may be added.

At 505, the UE may determine a value for $P_{max}$ for a current time window based on RF exposure limits. In some cases, the value for $P_{max}$ may be provided by a power control procedure (e.g., an outer loop power control procedure) that uses time averaging over a time period to provide values for $P_{max}$ such that the UE transmits at useful transmit powers while providing sufficient power budget for subsequent time windows. In some cases, the provided transmit power may account for multiple different RATs that may concurrently transmit (e.g. cellular RATs. Wi-Fi, Bluetooth, etc.). In some cases, the power control procedure may provide for compliance with SAR and MPE RF exposure requirements, and the $P_{max}$ value would allow for continuous transmission by the UE for the entire duration of the current time window.

At 510, the UE may determine uplink transmission periods for a number of prior time windows (e.g., M prior time windows). In some cases, such prior uplink transmission periods may correspond to an actual duration of uplink transmissions for the prior transmission periods, which may be different than a set of configured uplink resources (e.g., a TDD configuration).

At 515, the UE may determine a computed uplink transmission period (or an uplink duty cycle (ULDC)) of the uplink transmission period for the current time window. In some cases, the computed uplink transmission period may be determined based on the operations at 510 (e.g., an average of the uplink transmission periods for the prior M time windows). In some cases, the computed uplink transmission period may be determined based on a predictive model using machine learning, such as discussed with reference to FIG. 4.

At 520, the UE may determine whether a scaled version of $P_{max}$ is less than a transmit power cap ($P_{cap}$) that is provided by the power control procedure. The scaled version of $P_{max}$ may correspond to $P_{max}$/ULDC, and the transmit power cap may be determined based on $P_{cap}$ and RRC configured uplink resources (e.g., $P_{cap}$/RRC_ULDC). Such a determination may provide a safety that provides that the UE does not attempt to transmit at a power that exceeds an allowable power cap (e.g., if the ULDC changes such that the scaled $P_{max}$ increases substantially).

At 525, the UE may select $P_{max}$/ULDC as the transmit power ($P_{tx}$) for the current time window in the event that this value is less than the transmit power cap. At 530, the UE may select the transmit power cap as the value for $P_{tx}$ in the event that the scaled value of $P_{max}$ exceeds the transmit power cap. In some cases, the UE may set $P_{max}$ to a value for a power limit ($P_{lim}$) for the current time window, and scale this value based on the computed uplink transmission period. In other cases, the value of $P_{lim}$ may be scaled to provide a value P that is based on past energy usage. The value $\hat{P}$ may then be scaled based on the computed uplink transmission period, and a minimum of the scaled $\hat{P}$ value or the $P_{cap}$ value may be selected as the transmit power (e.g., $P_{tx}$) for the current time period.

Figure 6:
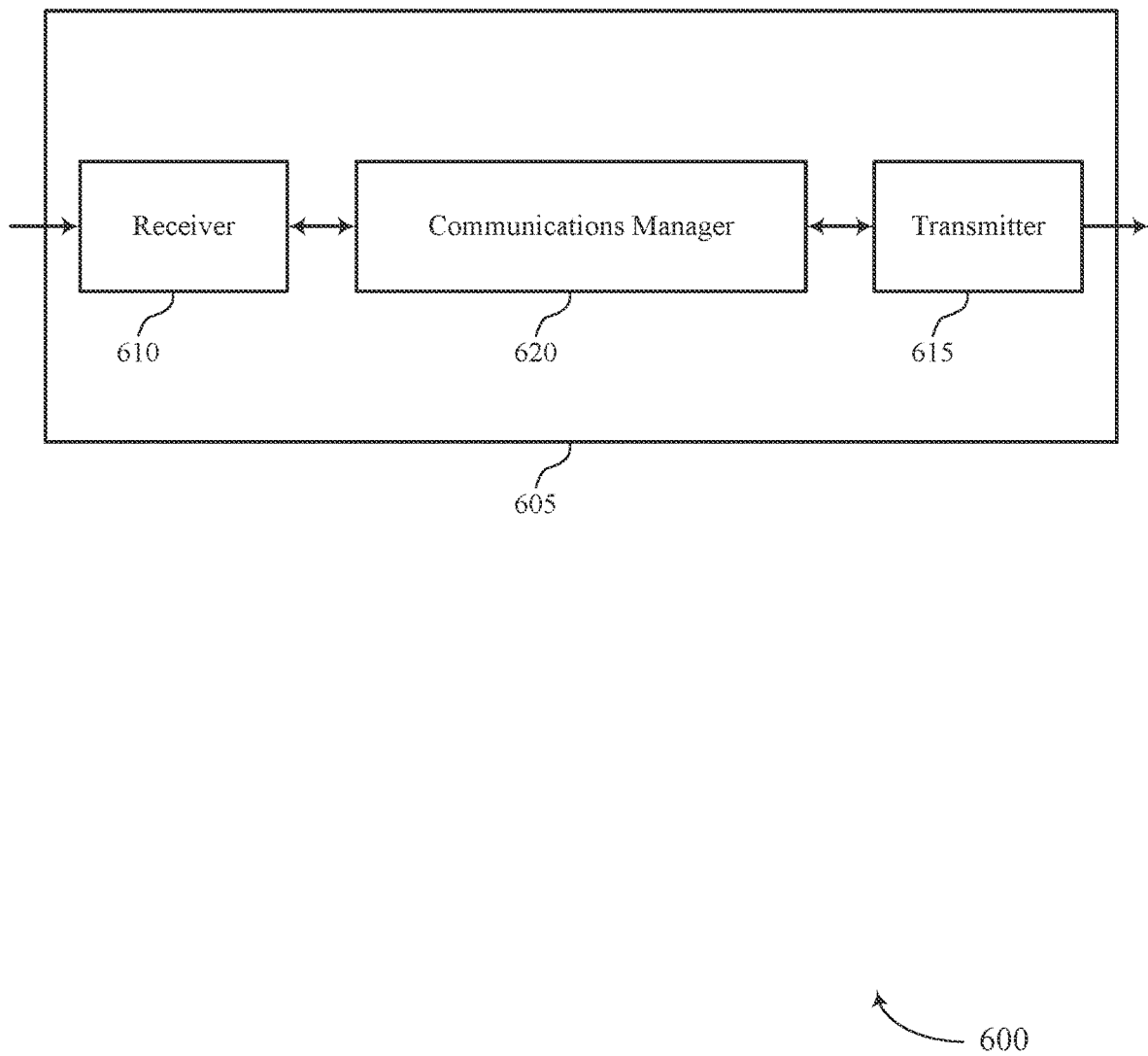
FIGS. 6 and 7 show block diagrams of devices that support techniques for uplink transmission-period-based transmission power for radio frequency exposure compliance in accordance with aspects of the present disclosure.

FIG. 6 shows a block diagram 600 of a device 605 that supports techniques for uplink transmission-period-based transmission power for radio frequency exposure compliance in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for uplink transmission-period-based transmission power for radio frequency exposure compliance). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for uplink transmission-period-based transmission power for radio frequency exposure compliance). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for uplink transmission-period-based transmission power for radio frequency exposure compliance as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for determining an uplink transmit power limit for a first time window based on a radio frequency exposure limit and a duration of the first time window. The communications manager 620 may be configured as or otherwise support a means for determining a first uplink transmit power based on the uplink transmit power limit and a computed uplink transmission period for the first time window, where the computed uplink transmission period is based on an actual uplink transmission period during at least a second time window that is prior to the first time window. The communications manager 620 may be configured as or otherwise support a means for transmitting one or more uplink transmissions during the first time window at the first uplink transmit power.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for transmit power determinations that may enhance communications by providing higher reliability and as a result fewer retransmissions. Thus, latency, bandwidth, and network efficiency may be enhanced, providing reduced power consumption (e.g., through fewer retransmissions, higher coding rates, etc.) and improved user experience.

Figure 7:
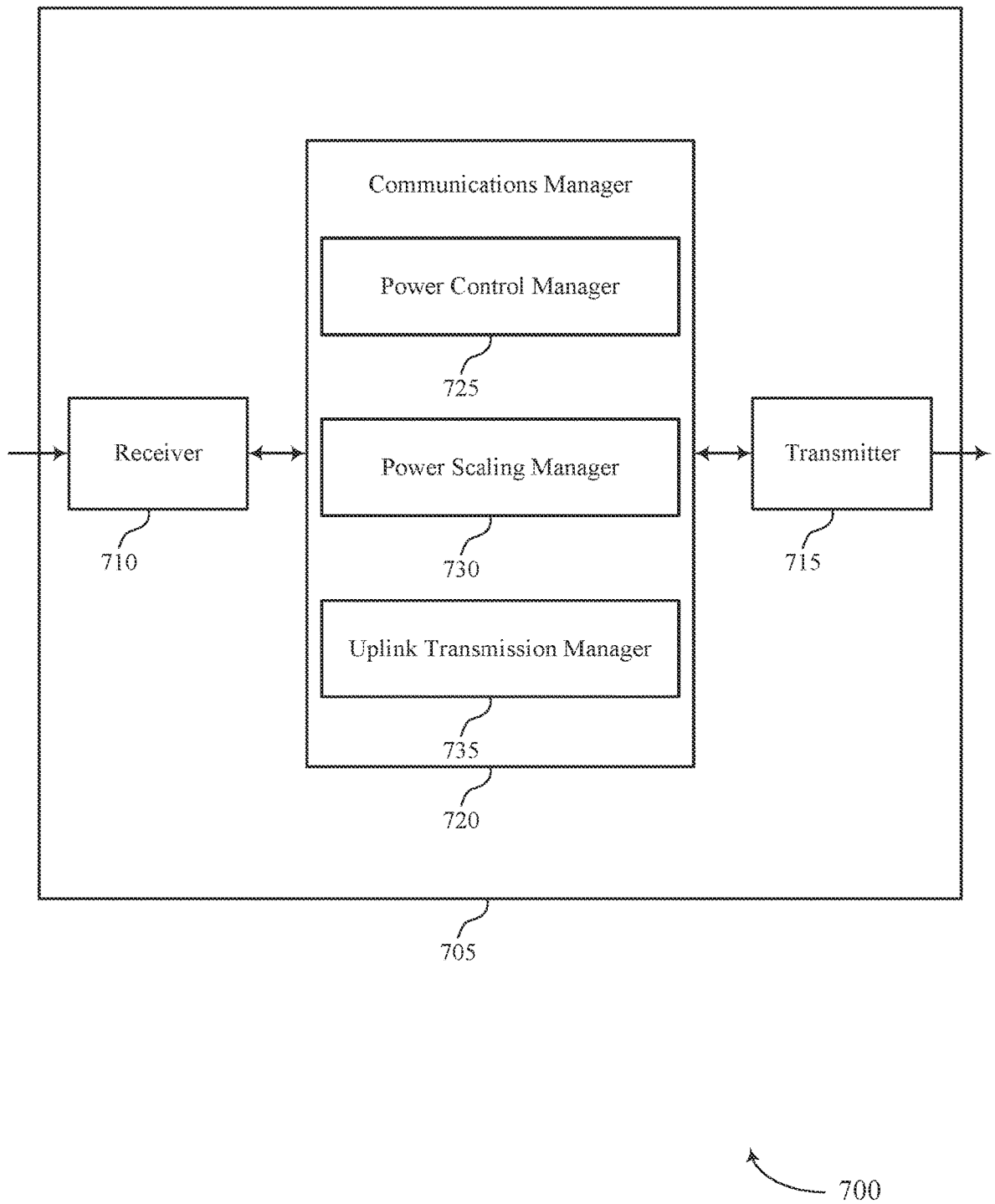

FIG. 7 shows a block diagram 700 of a device 705 that supports techniques for uplink transmission-period-based transmission power for radio frequency exposure compliance in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for uplink transmission-period-based transmission power for radio frequency exposure compliance). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for uplink transmission-period-based transmission power for radio frequency exposure compliance). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for uplink transmission-period-based transmission power for radio frequency exposure compliance as described herein. For example, the communications manager 720 may include a power control manager 725, a power scaling manager 730, an uplink transmission manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The power control manager 725 may be configured as or otherwise support a means for determining an uplink transmit power limit for a first time window based on a radio frequency exposure limit and a duration of the first time window. The power scaling manager 730 may be configured as or otherwise support a means for determining a first uplink transmit power based on the uplink transmit power limit and a computed uplink transmission period for the first time window, where the computed uplink transmission period is based on an actual uplink transmission period during at least a second time window that is prior to the first time window. The uplink transmission manager 735 may be configured as or otherwise support a means for transmitting one or more uplink transmissions during the first time window at the first uplink transmit power.

Figure 8:
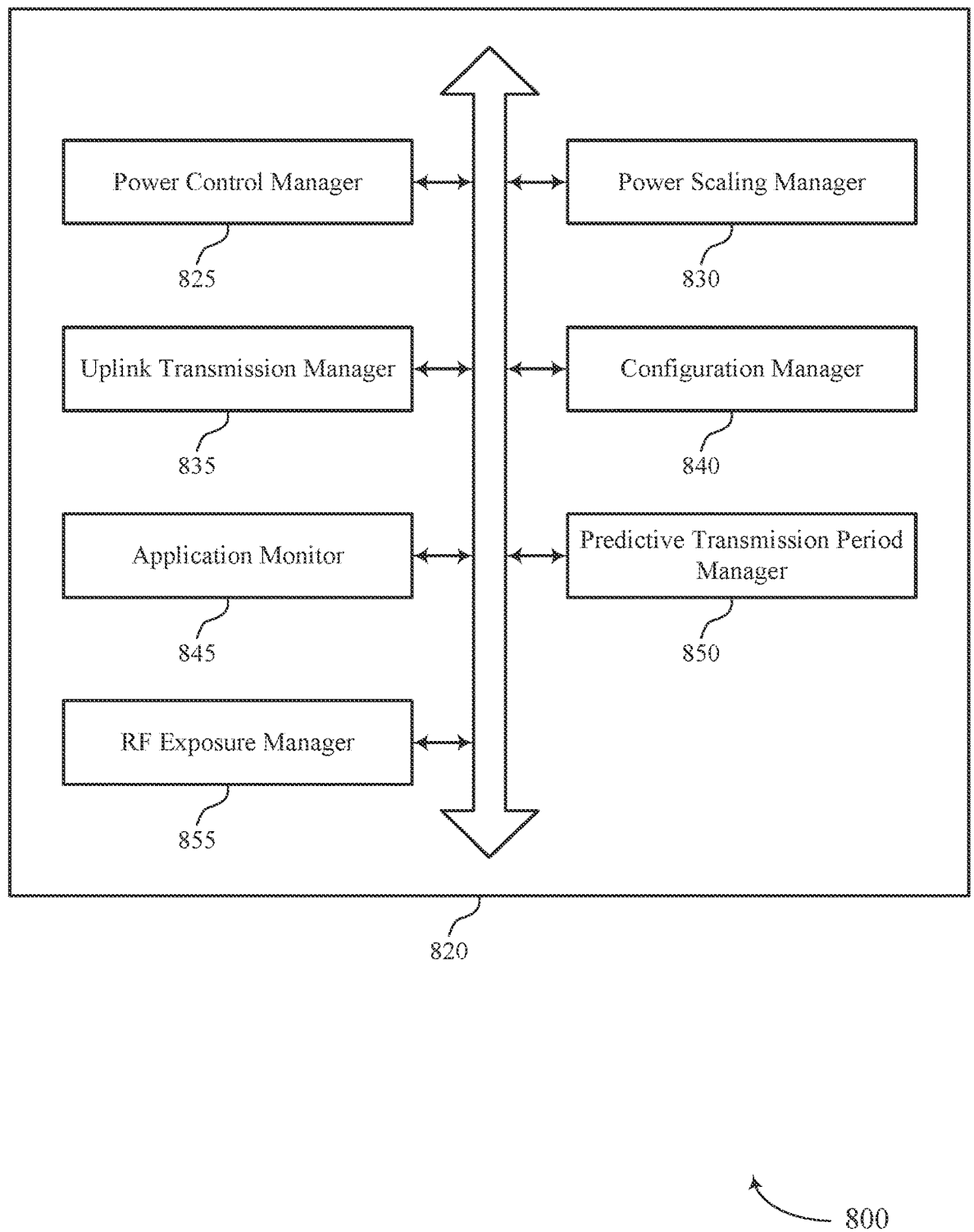
FIG. 8 shows a block diagram of a communications manager that supports techniques for uplink transmission-period-based transmission power for radio frequency exposure compliance in accordance with aspects of the present disclosure.

FIG. 8 shows a block diagram 800 of a communications manager 820 that supports techniques for uplink transmission-period-based transmission power for radio frequency exposure compliance in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for uplink transmission-period-based transmission power for radio frequency exposure compliance as described herein. For example, the communications manager 820 may include a power control manager 825, a power scaling manager 830, an uplink transmission manager 835, a configuration manager 840, an application monitor 845, a predictive transmission period manager 850, an RF exposure manager 855, or any combination thereof. Each of these components may communicate, directly or indirectly, with one another (e.g., via one or more buses).

The communications manager 820 may support wireless communication at a UE in accordance with examples as disclosed herein. The power control manager 825 may be configured as or otherwise support a means for determining an uplink transmit power limit for a first time window based on a radio frequency exposure limit and a duration of the first time window. The power scaling manager 830 may be configured as or otherwise support a means for determining a first uplink transmit power based on the uplink transmit power limit and a computed uplink transmission period for the first time window, where the computed uplink transmission period is based on an actual uplink transmission period during at least a second time window that is prior to the first time window. The uplink transmission manager 835 may be configured as or otherwise support a means for transmitting one or more uplink transmissions during the first time window at the first uplink transmit power.

In some examples, the uplink transmit power limit for the first time window provides an average power for uplink transmissions that span an entire time period of the first time window and that meets the radio frequency exposure limit, and is determined based on a transmit power control procedure that spans a set of multiple time windows.

In some examples, to support determining the first uplink transmit power, the power scaling manager 830 may be configured as or otherwise support a means for scaling the uplink transmit power limit for the first time window based on the computed uplink transmission period, or a predicted uplink transmission period, to obtain a scaled uplink transmit power limit, and where the first uplink transmit power is based on the scaled uplink transmit power limit.

In some examples, to support determining the first uplink transmit power, the power scaling manager 830 may be configured as or otherwise support a means for scaling the maximum allowed transmit power for the first time window based on a configured maximum uplink transmission period to obtain a scaled maximum allowed transmit power. In some examples, to support determining the first uplink transmit power, the power scaling manager 830 may be configured as or otherwise support a means for selecting a minimum of the scaled uplink transmit power limit or the scaled maximum allowed transmit power as the first uplink transmit power.

In some examples, to support determining the first uplink transmit power, the power scaling manager 830 may be configured as or otherwise support a means for obtaining, based on a transmit power control procedure that spans a set of multiple time windows prior to the first time window, an adjusted average power for uplink transmissions that span an entire time period of the first time window and a maximum allowed transmit power for the first time window that meets the radio frequency exposure limit, where the adjusted average power is adjusted based on an energy usage of uplink transmissions over the set of multiple time windows. In some examples, to support determining the first uplink transmit power, the power scaling manager 830 may be configured as or otherwise support a means for scaling the adjusted average power based on the computed uplink transmission period to obtain a scaled adjusted average power. In some examples, to support determining the first uplink transmit power, the power scaling manager 830 may be configured as or otherwise support a means for scaling the maximum allowed transmit power for the first time window based on a configured maximum uplink transmission period to obtain a scaled maximum allowed transmit power. In some examples, to support determining the first uplink transmit power, the power scaling manager 830 may be configured as or otherwise support a means for selecting a minimum of the scaled adjusted average power or the scaled maximum allowed transmit power as the first uplink transmit power.

In some examples, the uplink transmit power limit includes a first uplink transmit power limit for an entire time period of the first time window. In such examples, to support determining the first uplink transmit power, the power scaling manager 830 may be configured as or otherwise support a means for scaling the first uplink transmit power limit to obtain a second uplink transmit power limit, and scaling the second uplink transmit power limit to obtain a third uplink transmit power limit, wherein the first uplink transmit power is based at least in part on the third uplink transmit power limit. In some examples, the first uplink transmit power limit is scaled based on a configured maximum uplink transmission period in the first time window to obtain the second uplink transmit power limit, and the second uplink transmit power limit is scaled based on the computed uplink transmission period in the first time window to obtain the third uplink transmit power limit. In some examples, the first uplink transmit power limit is scaled based on the computed uplink transmission period in the first time window to obtain the second uplink transmit power limit, and the second uplink transmit power limit is scaled based on a configured maximum uplink transmission period in the first time window to obtain the third uplink transmit power limit.

In some examples, the computed uplink transmission period is less than a configured maximum uplink transmission period that is configured at the UE through RRC signaling. In some examples, the computed uplink transmission period is based on an average actual uplink transmission period of a predetermined number of time windows prior to the first time window. In some examples, the predetermined number of time windows prior to the first time window correspond to a predetermined number of milliseconds over which to average actual uplink transmission periods. In some examples, the computed uplink transmission period is based on one or more applications that generates uplink data that is to be transmitted during the first time window.

In some examples, the computed uplink transmission period is based on one or more of a predictive model generated using artificial intelligence or machine learning, a type of application that generates uplink data that is to be transmitted, or any combinations thereof. In some examples, the predictive model is based on predicted upcoming network conditions and associated uplink transmission periods. In some examples, the computed uplink transmission period is based on an indication received from a network node that provides the computed uplink transmission period based on observed uplink transmission period of a set of multiple different UEs.

In some examples, the computed uplink transmission period is based on one or more of a transmit power pattern of the UE, an antenna usage pattern of the UE, a user behavior pattern, an uplink transmission type, an uplink transmission priority pattern, an application pattern, an application type that generated uplink data to be transmitted, a wireless network pattern, sensor information at the UE, or any combinations thereof. In some examples, the radio frequency exposure limit includes a specific absorption rate (SAR) limit, maximum permissible exposure (MPE) limit, power density (PD) limit, or any combinations thereof. In some examples, the first uplink transmit power is higher than the uplink transmit power limit of the first time window. In some examples, the uplink transmit power limit of the first time window is determined based on the radio frequency exposure limit and one or more transmit powers of one or more other radios at the UE during at least the first time window.

Figure 9:
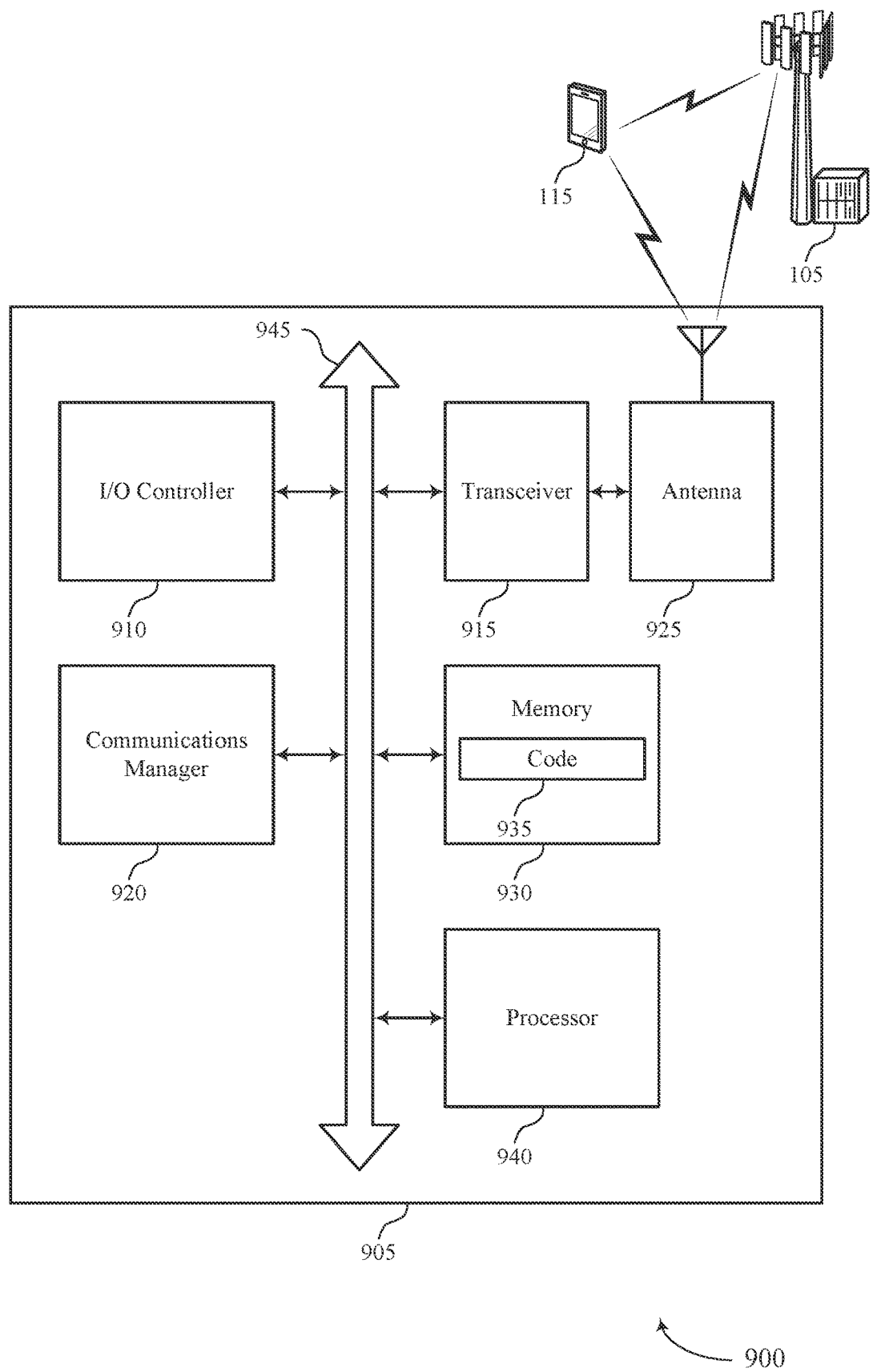
FIG. 9 shows a diagram of a system including a device that supports techniques for uplink transmission-period-based transmission power for radio frequency exposure compliance in accordance with aspects of the present disclosure.

FIG. 9 shows a diagram of a system 900 including a device 905 that supports techniques for uplink transmission-period-based transmission power for radio frequency exposure compliance in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for uplink transmission-period-based transmission power for radio frequency exposure compliance). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for determining an uplink transmit power limit for a first time window based on a radio frequency exposure limit and a duration of the first time window. The communications manager 920 may be configured as or otherwise support a means for determining a first uplink transmit power based on the uplink transmit power limit and a computed uplink transmission period for the first time window, where the computed uplink transmission period is based on an actual uplink transmission period during at least a second time window that is prior to the first time window. The communications manager 920 may be configured as or otherwise support a means for transmitting one or more uplink transmissions during the first time window at the first uplink transmit power.

By including or configuring the communications manager 920 in accordance with examples as described herein, the device 905 may support techniques for transmit power determinations that may enhance communications by providing higher reliability and as a result fewer retransmissions. Thus, latency, bandwidth, and network efficiency may be enhanced, providing reduced power consumption (e.g., through fewer retransmissions, higher coding rates, etc.) and improved user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for uplink transmission-period-based transmission power for radio frequency exposure compliance as described herein, or the processor 940 and the memory 930 may be otherwise configured to perform or support such operations.

Figure 10:
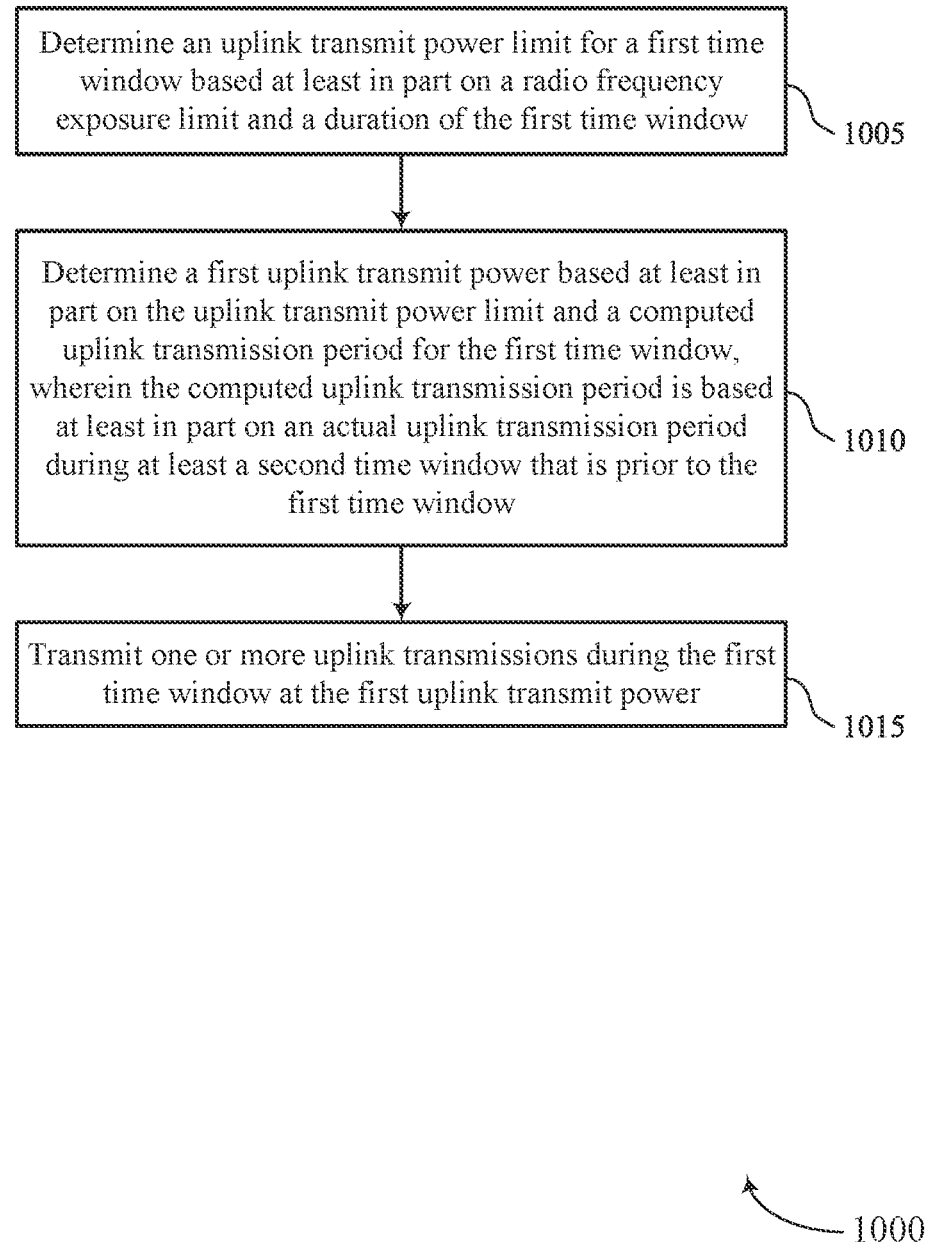
FIGS. 10 through 12 show flowcharts illustrating methods that support techniques for uplink transmission-period-based transmission power for radio frequency exposure compliance in accordance with aspects of the present disclosure.

FIG. 10 shows a flowchart illustrating a method 1000 that supports techniques for uplink transmission-period-based transmission power for radio frequency exposure compliance in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include determining an uplink transmit power limit for a first time window based on a radio frequency exposure limit and a duration of the first time window. The operations of 1005 may be performed in accordance with examples as disclosed herein. In some examples, aspects of the operations of 1005 may be performed by a power control manager 825 as described with reference to FIG. 8.

At 1010, the method may include determining a first uplink transmit power based on the uplink transmit power limit and a computed uplink transmission period for the first time window, where the computed uplink transmission period is based on an actual uplink transmission period during at least a second time window that is prior to the first time window. The operations of 1010 may be performed in accordance with examples as disclosed herein. In some examples, aspects of the operations of 1010 may be performed by a power scaling manager 830 as described with reference to FIG. 8.

At 1015, the method may include transmitting one or more uplink transmissions during the first time window at the first uplink transmit power. The operations of 1015 may be performed in accordance with examples as disclosed herein. In some examples, aspects of the operations of 1015 may be performed by an uplink transmission manager 835 as described with reference to FIG. 8.

Figure 11:
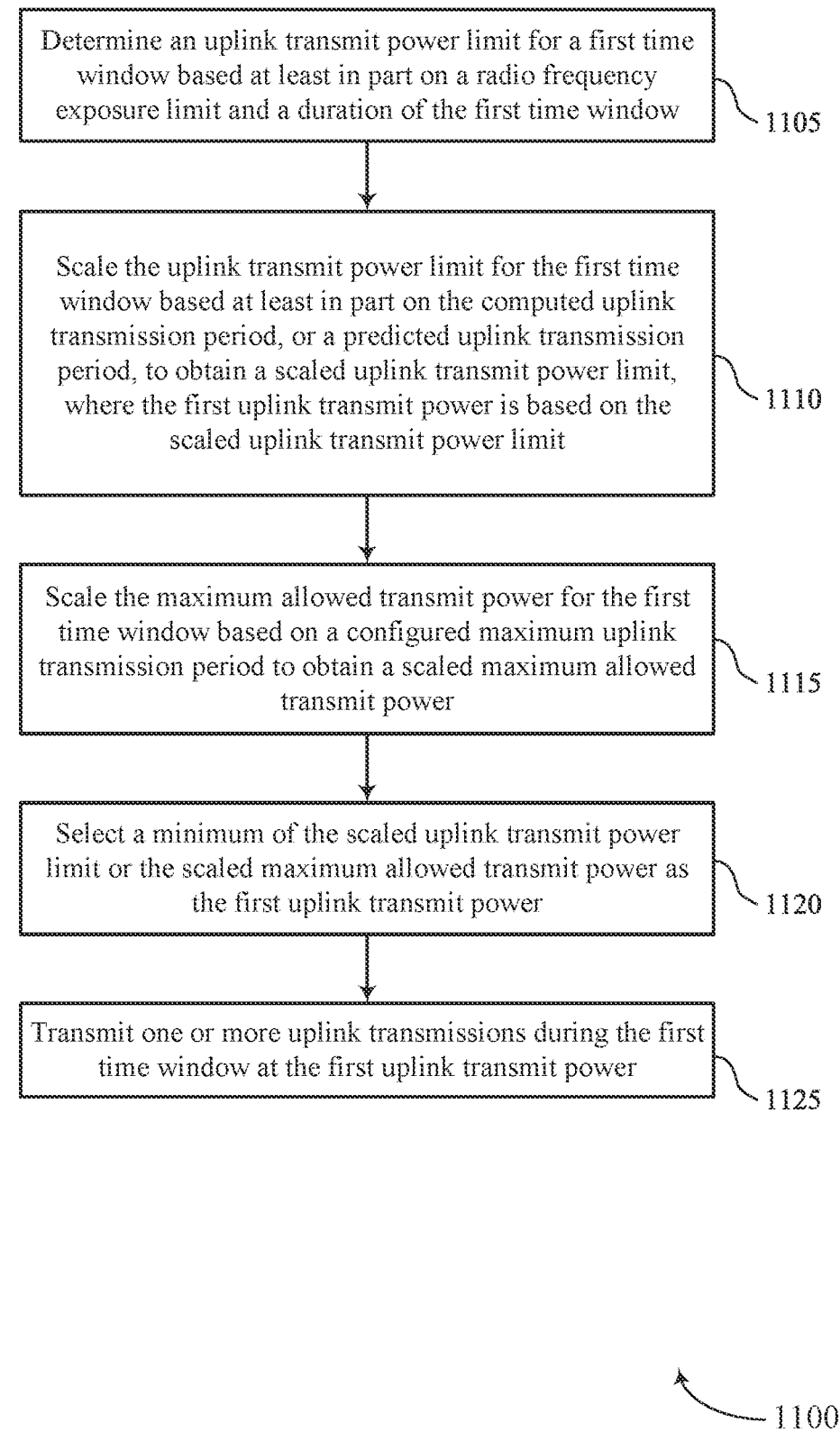

FIG. 11 shows a flowchart illustrating a method 1100 that supports techniques for uplink transmission-period-based transmission power for radio frequency exposure compliance in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include determining an uplink transmit power limit for a first time window based on a radio frequency exposure limit and a duration of the first time window. The operations of 1105 may be performed in accordance with examples as disclosed herein. In some examples, aspects of the operations of 1105 may be performed by a power control manager 825 as described with reference to FIG. 8. In some cases, the uplink transmission power limit for the first time window provides an average power for uplink transmissions that span an entire time period of the first time window and that meets an RF exposure limit, and is determined based on a transmit power control procedure that spans a set of multiple time windows.

At 1110, the method may include scaling the uplink transmit power limit for a first time window based on the computed uplink transmission period, or a predicted uplink transmission period, to obtain a scaled uplink transmit power limit, and where a first uplink transmit power for the first time window is based on the scaled uplink transmit power limit. The operations of 1110 may be performed in accordance with examples as disclosed herein. In some examples, aspects of the operations of 1110 may be performed by a power scaling manager 830 as described with reference to FIG. 8.

At 1115, the method may include scaling a maximum allowed transmit power for the first time window based on a configured maximum uplink transmission period to obtain a scaled maximum allowed transmit power. The operations of 1120 may be performed in accordance with examples as disclosed herein. In some examples, aspects of the operations of 1120 may be performed by a power scaling manager 830 as described with reference to FIG. 8.

At 1120, the method may include selecting a minimum of the scaled uplink transmit power limit or the scaled maximum allowed transmit power as the first uplink transmit power. The operations of 1125 may be performed in accordance with examples as disclosed herein. In some examples, aspects of the operations of 1125 may be performed by a power scaling manager 830 as described with reference to FIG. 8.

At 1125, the method may include transmitting one or more uplink transmissions during the first time window at the first uplink transmit power. The operations of 1130 may be performed in accordance with examples as disclosed herein. In some examples, aspects of the operations of 1130 may be performed by an uplink transmission manager 835 as described with reference to FIG. 8.

Figure 12:
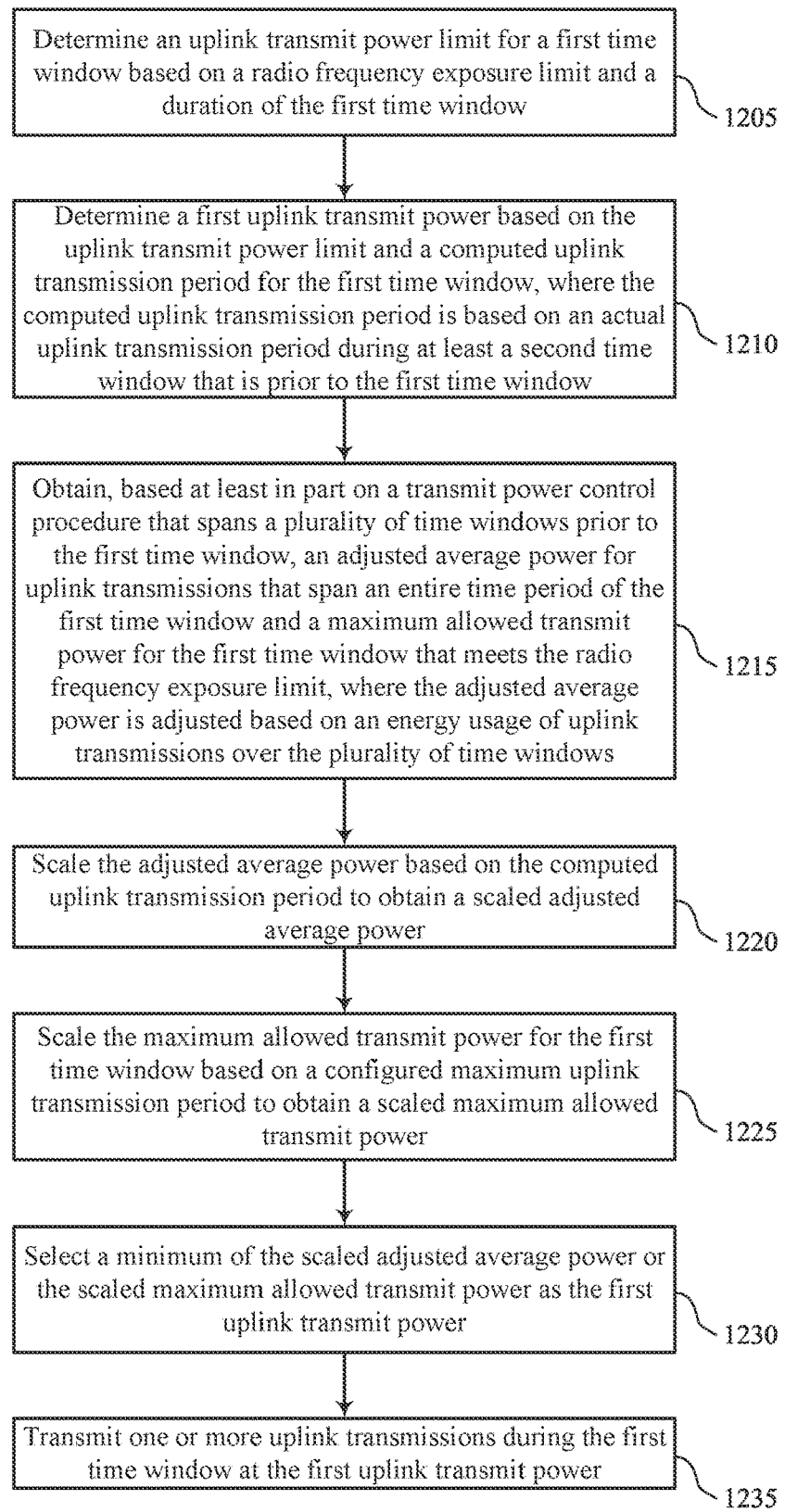

FIG. 12 shows a flowchart illustrating a method 1200 that supports techniques for uplink transmission-period-based transmission power for radio frequency exposure compliance in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include determining an uplink transmit power limit for a first time window based on a radio frequency exposure limit and a duration of the first time window. The operations of 1205 may be performed in accordance with examples as disclosed herein. In some examples, aspects of the operations of 1205 may be performed by a power control manager 825 as described with reference to FIG. 8.

At 1210, the method may include determining a first uplink transmit power based on the uplink transmit power limit and a computed uplink transmission period for the first time window, where the computed uplink transmission period is based on an actual uplink transmission period during at least a second time window that is prior to the first time window. The operations of 1210 may be performed in accordance with examples as disclosed herein. In some examples, aspects of the operations of 1210 may be performed by a power scaling manager 830 as described with reference to FIG. 8.

At 1215, the method may include obtaining, based on a transmit power control procedure that spans a set of multiple time windows prior to the first time window, an adjusted average power for uplink transmissions that span an entire time period of the first time window and a maximum allowed transmit power for the first time window that meets the radio frequency exposure limit, where the adjusted average power is adjusted based on an energy usage of uplink transmissions over the set of multiple time windows. The operations of 1215 may be performed in accordance with examples as disclosed herein. In some examples, aspects of the operations of 1215 may be performed by a power scaling manager 830 as described with reference to FIG. 8.

At 1220, the method may include scaling the adjusted average power based on the computed uplink transmission period to obtain a scaled adjusted average power. The operations of 1220 may be performed in accordance with examples as disclosed herein. In some examples, aspects of the operations of 1220 may be performed by a power scaling manager 830 as described with reference to FIG. 8.

At 1225, the method may include scaling the maximum allowed transmit power for the first time window based on a configured maximum uplink transmission period to obtain a scaled maximum allowed transmit power. The operations of 1225 may be performed in accordance with examples as disclosed herein. In some examples, aspects of the operations of 1225 may be performed by a power scaling manager 830 as described with reference to FIG. 8.

At 1230, the method may include selecting a minimum of the scaled adjusted average power or the scaled maximum allowed transmit power as the first uplink transmit power. The operations of 1230 may be performed in accordance with examples as disclosed herein. In some examples, aspects of the operations of 1230 may be performed by a power scaling manager 830 as described with reference to FIG. 8.

At 1235, the method may include transmitting one or more uplink transmissions during the first time window at the first uplink transmit power. The operations of 1235 may be performed in accordance with examples as disclosed herein. In some examples, aspects of the operations of 1235 may be performed by an uplink transmission manager 835 as described with reference to FIG. 8.

The following provides an overview of aspects of the present disclosure:

Aspect 1: A method for wireless communication at a UE, comprising: determining an uplink transmit power limit for a first time window based at least in part on a radio frequency exposure limit and a duration of the first time window; determining a first uplink transmit power based at least in part on the uplink transmit power limit and a computed uplink transmission period for the first time window, wherein the computed uplink transmission period is based at least in part on an actual uplink transmission period during at least a second time window that is prior to the first time window; and transmitting one or more uplink transmissions during the first time window at the first uplink transmit power.

Aspect 2: The method of aspect 1, wherein the uplink transmit power limit for the first time window provides an average power for uplink transmissions that span an entire time period of the first time window and that meets the radio frequency exposure limit, and is determined based on a transmit power control procedure that spans a plurality of time windows.

Aspect 3: The method of aspect 2, wherein the determining the first uplink transmit power comprises: scaling the uplink transmit power limit for the first time window based at least in part on the computed uplink transmission period, or a predicted uplink transmission period, to obtain a scaled uplink transmit power limit, and wherein the first uplink transmit power is based at least in part on the scaled uplink transmit power limit.

Aspect 4: The method of aspect 3, wherein the transmit power control procedure further provides a maximum allowed transmit power for the first time window, and wherein the determining the first uplink transmit power further comprises: scaling the maximum allowed transmit power for the first time window based at least in part on a configured maximum uplink transmission period to obtain a scaled maximum allowed transmit power; and selecting a minimum of the scaled uplink transmit power limit or the scaled maximum allowed transmit power as the first uplink transmit power.

Aspect 5: The method of any of aspects 1 through 4, wherein the determining the first uplink transmit power comprises: obtaining, based at least in part on a transmit power control procedure that spans a plurality of time windows prior to the first time window, an adjusted average power for uplink transmissions that span an entire time period of the first time window and a maximum allowed transmit power for the first time window that meets the radio frequency exposure limit, wherein the adjusted average power is adjusted based at least in part on an energy usage of uplink transmissions over the plurality of time windows;

scaling the adjusted average power based at least in part on the computed uplink transmission period to obtain a scaled adjusted average power; scaling the maximum allowed transmit power for the first time window based at least in part on a configured maximum uplink transmission period to obtain a scaled maximum allowed transmit power; and selecting a minimum of the scaled adjusted average power or the scaled maximum allowed transmit power as the first uplink transmit power.

Aspect 6: The method of any of aspects 1 through 5, wherein the uplink transmit power limit comprises a first uplink transmit power limit for an entire time period of the first time window, and wherein the determining the first uplink transmit power comprises: scaling the first uplink transmit power limit to obtain a second uplink transmit power limit; and scaling the second uplink transmit power limit to obtain a third uplink transmit power limit, where the first uplink transmit power is based on the third uplink transmit power limit.

Aspect 7: The method of any of aspects 1 through 6, wherein the first uplink transmit power limit is scaled based on a configured maximum uplink transmission period in the first time window to obtain the second uplink transmit power limit, and the second uplink transmit power limit is scaled based on the computed uplink transmission period in the first time window to obtain the third uplink transmit power limit.

Aspect 8: The method of any of aspects 1 through 6, wherein the first uplink transmit power limit is scaled based on the computed uplink transmission period in the first time window to obtain the second uplink transmit power limit, and the second uplink transmit power limit is scaled based on a configured maximum uplink transmission period in the first time window to obtain the third uplink transmit power limit.

Aspect 9: The method of any of aspects 1 through 8, wherein the computed uplink transmission period is less than a configured maximum uplink transmission period that is configured at the UE through RRC signaling.

Aspect 10: The method of any of aspects 1 through 9, wherein the computed uplink transmission period is based at least in part on an average actual uplink transmission period of a predetermined number of time windows prior to the first time window.

Aspect 11: The method of aspect 10, wherein the predetermined number of time windows prior to the first time window correspond to a predetermined number of milliseconds over which to average actual uplink transmission periods.

Aspect 12: The method of any of aspects 1 through 11, wherein the computed uplink transmission period is based at least in part on one or more applications that generates uplink data that is to be transmitted during the first time window.

Aspect 13: The method of any of aspects 1 through 12, wherein the computed uplink transmission period is based at least in part on one or more of a predictive model generated using artificial intelligence or machine learning, a type of application that generates uplink data that is to be transmitted, or any combinations thereof.

Aspect 14: The method of aspect 13, wherein the predictive model is based at least in part on predicted upcoming network conditions and associated uplink transmission periods.

Aspect 15: The method of any of aspects 1 through 14, wherein the computed uplink transmission period is based at least in part on an indication received from a network node that provides the computed uplink transmission period based at least in part on observed uplink transmission period of a plurality of different UEs.

Aspect 16: The method of any of aspects 1 through 15, wherein the computed uplink transmission period is based at least in part on one or more of a transmit power pattern of the UE, an antenna usage pattern of the UE, a user behavior pattern, an uplink transmission type, an uplink transmission priority pattern, an application pattern, an application type that generated uplink data to be transmitted, a wireless network pattern, sensor information at the UE, or any combinations thereof.

Aspect 17: The method of any of aspects 1 through 16, wherein the radio frequency exposure limit comprises a specific absorption rate (SAR) limit, maximum permissible exposure (MPE) limit, power density (PD) limit, or any combinations thereof.

Aspect 18: The method of any of aspects 1 through 17, wherein the first uplink transmit power is higher than the uplink transmit power limit of the first time window.

Aspect 19: The method of any of aspects 1 through 18, wherein the uplink transmit power limit of the first time window is determined based at least in part on the radio frequency exposure limit and one or more transmit powers of one or more other radios at the UE during at least the first time window.

Aspect 20: An apparatus for wireless communication at a UE, comprising a processor; memory coupled with the processor; and instructions stored in the memory and executable by the processor to cause the apparatus to perform a method of any of aspects 1 through 19.

Aspect 21: An apparatus for wireless communication at a UE, comprising at least one means for performing a method of any of aspects 1 through 19.

Aspect 22: A non-transitory computer-readable medium storing code for wireless communication at a UE, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    determining an uplink transmit power limit for a first time window based at least in part on a radio frequency exposure limit and a duration of the first time window;
    determining a first uplink transmit power based at least in part on the uplink transmit power limit and a computed uplink transmission period for the first time window, wherein the computed uplink transmission period is based at least in part on an actual uplink transmission period during at least a second time window that is prior to the first time window; and
    transmitting one or more uplink transmissions during the first time window at the first uplink transmit power.

2. The method of claim 1, wherein the uplink transmit power limit for the first time window provides an average power for uplink transmissions that span an entire time period of the first time window and that meets the radio frequency exposure limit, and is determined based on a transmit power control procedure that spans a plurality of time windows.

3. The method of claim 2, wherein the determining the first uplink transmit power comprises:

scaling the uplink transmit power limit for the first time window based at least in part on the computed uplink transmission period, or a predicted uplink transmission period, to obtain a scaled uplink transmit power limit, and wherein the first uplink transmit power is based at least in part on the scaled uplink transmit power limit.

4. The method of claim 3, wherein the transmit power control procedure further provides a maximum allowed transmit power for the first time window, and wherein the determining the first uplink transmit power further comprises:
scaling the maximum allowed transmit power for the first time window based at least in part on a configured maximum uplink transmission period to obtain a scaled maximum allowed transmit power; and
selecting a minimum of the scaled uplink transmit power limit or the scaled maximum allowed transmit power as the first uplink transmit power.

5. The method of claim 1, wherein the determining the first uplink transmit power comprises:
obtaining, based at least in part on a transmit power control procedure that spans a plurality of time windows prior to the first time window, an adjusted average power for uplink transmissions that span an entire time period of the first time window and a maximum allowed transmit power for the first time window that meets the radio frequency exposure limit, wherein the adjusted average power is adjusted based at least in part on an energy usage of uplink transmissions over the plurality of time windows;
scaling the adjusted average power based at least in part on the computed uplink transmission period to obtain a scaled adjusted average power;
scaling the maximum allowed transmit power for the first time window based at least in part on a configured maximum uplink transmission period to obtain a scaled maximum allowed transmit power; and
selecting a minimum of the scaled adjusted average power or the scaled maximum allowed transmit power as the first uplink transmit power.

6. The method of claim 1, wherein the uplink transmit power limit comprises a first uplink transmit power limit for an entire time period of the first time window, and wherein the determining the first uplink transmit power further comprises:
scaling the first uplink transmit power limit to obtain a second uplink transmit power limit; and
scaling the second uplink transmit power limit to obtain a third uplink transmit power limit, wherein the first uplink transmit power is based at least in part on the third uplink transmit power limit.

7. The method of claim 6, wherein the first uplink transmit power limit is scaled based at least in part on a configured maximum uplink transmission period in the first time window to obtain the second uplink transmit power limit, and the second uplink transmit power limit is scaled based at least in part on the computed uplink transmission period in the first time window to obtain the third uplink transmit power limit.

8. The method of claim 6, wherein the first uplink transmit power limit is scaled based at least in part on the computed uplink transmission period in the first time window to obtain the second uplink transmit power limit, and the second uplink transmit power limit is scaled based at least in part on a configured maximum uplink transmission period in the first time window to obtain the third uplink transmit power limit.

9. The method of claim 1, wherein the computed uplink transmission period is less than a configured maximum uplink transmission period that is configured at the UE through radio resource control (RRC) signaling.

10. The method of claim 1, wherein the computed uplink transmission period is based at least in part on an average actual uplink transmission period of a predetermined number of time windows prior to the first time window.

11. The method of claim 10, wherein the predetermined number of time windows prior to the first time window correspond to a predetermined number of milliseconds over which to average actual uplink transmission periods.

12. The method of claim 1, wherein the computed uplink transmission period is based at least in part on one or more applications that generates uplink data that is to be transmitted during the first time window.

13. The method of claim 1, wherein the computed uplink transmission period is based at least in part on one or more of a predictive model generated using artificial intelligence or machine learning, a type of application that generates uplink data that is to be transmitted, or any combinations thereof.

14. The method of claim 13, wherein the predictive model is based at least in part on predicted upcoming network conditions and associated uplink transmission periods.

15. The method of claim 1, wherein the computed uplink transmission period is based at least in part on an indication received from a network node that provides the computed uplink transmission period based at least in part on observed uplink transmission period of a plurality of different UEs.

16. The method of claim 1, wherein the computed uplink transmission period is based at least in part on one or more of a transmit power pattern of the UE, an antenna usage pattern of the UE, a user behavior pattern, an uplink transmission type, an uplink transmission priority pattern, an application pattern, an application type that generated uplink data to be transmitted, a wireless network pattern, sensor information at the UE, or any combinations thereof.

17. The method of claim 1, wherein the radio frequency exposure limit comprises a specific absorption rate (SAR) limit, maximum permissible exposure (MPE) limit, power density (PD) limit, or any combinations thereof.

18. The method of claim 1, wherein the first uplink transmit power is higher than the uplink transmit power limit of the first time window.

19. The method of claim 1, wherein the uplink transmit power limit of the first time window is determined based at least in part on the radio frequency exposure limit and one or more transmit powers of one or more other radios at the UE during at least the first time window.

20. An apparatus for wireless communication at a user equipment (UE), comprising:
a processor;
memory coupled with the processor; and
instructions stored in the memory and executable by the processor to cause the apparatus to:
determine an uplink transmit power limit for a first time window based at least in part on a radio frequency exposure limit and a duration of the first time window,
determine a first uplink transmit power based at least in part on the uplink transmit power limit and a computed uplink transmission period for the first time window, wherein the computed uplink transmission period is based at least in part on an actual uplink transmission period during at least a second time window that is prior to the first time window; and transmit one or more uplink transmissions during the first time window at the first uplink transmit power.

21. The apparatus of claim 20, wherein the uplink transmit power limit for the first time window provides an average power for uplink transmissions that span an entire time period of the first time window and that meets the radio frequency exposure limit, and is determined based on a transmit power control procedure that spans a plurality of time windows.

22. The apparatus of claim 21, wherein the instructions to determine the first uplink transmit power are executable by the processor to cause the apparatus to:
scale the uplink transmit power limit for the first time window based at least in part on the computed uplink transmission period, or a predicted uplink transmission period, to obtain a scaled uplink transmit power limit, and wherein the first uplink transmit power is based at least in part on the scaled uplink transmit power limit.

23. The apparatus of claim 22, wherein the transmit power control procedure further provides a maximum allowed transmit power for the first time window, and wherein the instructions to determine the first uplink transmit power are further executable by the processor to cause the apparatus to:
scale the maximum allowed transmit power for the first time window based at least in part on a configured maximum uplink transmission period to obtain a scaled maximum allowed transmit power; and
select a minimum of the scaled uplink transmit power limit or the scaled maximum allowed transmit power as the first uplink transmit power.

24. The apparatus of claim 20, wherein the instructions to determine the first uplink transmit power are executable by the processor to cause the apparatus to:
obtain, based at least in part on a transmit power control procedure that spans a plurality of time windows prior to the first time window, an adjusted average power for uplink transmissions that span an entire time period of the first time window and a maximum allowed transmit power for the first time window that meets the radio frequency exposure limit, wherein the adjusted average power is adjusted based at least in part on an energy usage of uplink transmissions over the plurality of time windows;
scale the adjusted average power based at least in part on the computed uplink transmission period to obtain a scaled adjusted average power;
scale the maximum allowed transmit power for the first time window based at least in part on a configured maximum uplink transmission period to obtain a scaled maximum allowed transmit power; and
select a minimum of the scaled adjusted average power or the scaled maximum allowed transmit power as the first uplink transmit power.

25. The apparatus of claim 20, wherein the uplink transmit power limit comprises a first uplink transmit power limit for an entire time period of the first time window, and wherein the instructions to determine the first uplink transmit power are executable by the processor to cause the apparatus to:

scale the first uplink transmit power limit to obtain a second uplink transmit power limit; and
scale the second uplink transmit power limit to obtain a third uplink transmit power limit, wherein the first uplink transmit power is based at least in part on the third uplink transmit power limit.

26. The apparatus of claim 25, wherein the first uplink transmit power limit is scaled based at least in part on a configured maximum uplink transmission period in the first time window to obtain the second uplink transmit power limit, and the second uplink transmit power limit is scaled based at least in part on the computed uplink transmission period in the first time window to obtain the third uplink transmit power limit.

27. The apparatus of claim 25, wherein the first uplink transmit power limit is scaled based at least in part on the computed uplink transmission period in the first time window to obtain the second uplink transmit power limit, and the second uplink transmit power limit is scaled based at least in part on a configured maximum uplink transmission period in the first time window to obtain the third uplink transmit power limit.

28. The apparatus of claim 20, wherein the computed uplink transmission period is less than a configured maximum uplink transmission period that is configured at the UE through radio resource control (RRC) signaling.

29. An apparatus for wireless communication at a user equipment (UE), comprising:
means for determining an uplink transmit power limit for a first time window based at least in part on a radio frequency exposure limit and a duration of the first time window;
means for determining a first uplink transmit power based at least in part on the uplink transmit power limit and a computed uplink transmission period for the first time window, wherein the computed uplink transmission period is based at least in part on an actual uplink transmission period during at least a second time window that is prior to the first time window; and
means for transmitting one or more uplink transmissions during the first time window at the first uplink transmit power.

30. A non-transitory computer-readable medium storing code for wireless communication at a user equipment (UE), the code comprising instructions executable by a processor to:
determine an uplink transmit power limit for a first time window based at least in part on a radio frequency exposure limit and a duration of the first time window;
determine a first uplink transmit power based at least in part on the uplink transmit power limit and a computed uplink transmission period for the first time window, wherein the computed uplink transmission period is based at least in part on an actual uplink transmission period during at least a second time window that is prior to the first time window; and
transmit one or more uplink transmissions during the first time window at the first uplink transmit power.

* * * * *